United States Patent [19]
Alexander et al.

[11] Patent Number: 5,504,609
[45] Date of Patent: Apr. 2, 1996

[54] WDM OPTICAL COMMUNICATION SYSTEM WITH REMODULATORS

[75] Inventors: Stephen B. Alexander, Millersville; Steve W. Chaddick; David R. Huber, both of Annapolis; Cecil D. Smith, Severna Park, all of Md.

[73] Assignee: Ciena Corporation, Columbia, Md.

[21] Appl. No.: 438,844

[22] Filed: May 11, 1995

[51] Int. Cl.$^6$ ................................................. H04J 14/02
[52] U.S. Cl. ............................ 359/125; 359/133; 359/176
[58] Field of Search ................................... 359/124, 125, 359/127, 133, 173, 174, 176

[56] References Cited

U.S. PATENT DOCUMENTS

| | | | |
|---|---|---|---|
| 4,641,371 | 2/1987 | Shutterly | 455/601 |
| 4,807,227 | 10/1987 | Fujiwara et al. | 370/3 |
| 4,945,531 | 7/1990 | Suzuki | 370/3 |
| 5,035,481 | 7/1991 | Mollenauer | 359/124 |
| 5,050,952 | 9/1991 | Fussgager | 359/114 |
| 5,140,456 | 8/1992 | Huber | 359/341 |

(List continued on next page.)

OTHER PUBLICATIONS

Gowar, Ed. *Optical Communication Systems*, (Prentice Hall, NY) c. 1983, pp. 1–25.
Chen, *Proc. IEEE*, vol. 58, No. 10, Oct. 1970, pp. 1440–1457.
Desurvire, *Erbium–Doped Fiber Amplifiers*, (John Wiley & Sons, NY) ©1994, pp. 568–575.
Bjarklev, *Optical Fiber Amplifiers*, (Artech House, Boston), ©1993, pp. 193–233.
Becker, *IEEE J. Quantum Elec.*, vol QE–20, No. 7, Jul. 1994, pp 723–727.
Fan et al. *Optics & Photonics News*, Feb. 1995, pp. 26–32.
Morey et al., *Optics and Photonics News*, Feb. 1994, pp. 8–14.
Wood, *J. Lightwave Tech.*, vol. 6, No. 6, Jun. 1988, pp. 743–757.

*Primary Examiner*—Leo Boudreau
*Assistant Examiner*—Kinfe-Michael Negash
*Attorney, Agent, or Firm*—Margaret A. Burke

[57] ABSTRACT

The present invention provides an optical communication system capable of placing incoming information-bearing optical signals onto plural optical signal channels for transmission over an optical waveguide. The optical system includes plural optical transmission elements, each transmission element emitting an information-bearing optical signal at a first transmission wavelength. Plural optical receiving systems are provided, each receiving system configured to receive an information-bearing optical signal at a particular reception wavelength. Each receiving system includes an optical filtering member comprising at least one Bragg grating member for selecting the particular reception wavelength. An optical waveguide optically communicates with each of the receiving systems for transmitting a plurality of optical signals. A plurality of optical amplifiers are positioned along the optical waveguide for amplifying plural optical signals simultaneously. A plurality of optical remodulators optically communicates with the optical transmission elements and the optical waveguide. Each optical remodulator is configured to receive an information-bearing optical signal at a transmission wavelength and output an information-bearing optical signal at a reception wavelength corresponding to a channel wavelength of the optical communication system. Each optical remodulator includes an optoelectronic element for receiving an information-bearing optical signal at a transmission wavelength and outputting a corresponding electrical signal which includes the information from the transmission information-bearing optical signal. The remodulator further includes an optical carrier emitting element comprising a light source for transmitting a non-information-bearing carrier optical signal at a reception wavelength. The remodulator additionally comprises an external modulator for imparting information directly onto the carrier optical signal from the electrical Signal. In this manner, incoming transmission signals are placed on the particular optical signal channels employed in the WDM system.

10 Claims, 2 Drawing Sheets

U.S. PATENT DOCUMENTS

| | | | |
|---|---|---|---|
| 5,166,821 | 11/1992 | Huber | 359/238 |
| 5,200,964 | 1/1992 | Huber | 372/26 |
| 5,202,782 | 4/1993 | Nakamura et al. | 359/124 |
| 5,224,183 | 6/1993 | Duggan | 359/127 |
| 5,257,124 | 10/1993 | Glaab et al. | 359/124 |
| 5,267,073 | 11/1993 | Tamburello et al. | 359/179 |
| 5,271,024 | 12/1993 | Huber | 372/6 |
| 5,295,209 | 3/1994 | Huber | 385/37 |
| 5,321,543 | 6/1994 | Huber | 359/187 |

WDM OPTICAL COMMUNICATION SYSTEM WITH REMODULATORS

FIELD OF THE INVENTION

The invention relates to optical communication systems generally and, more particularly, to optical communication systems which carry plural optical signals of different wavelengths simultaneously.

BACKGROUND OF THE INVENTION:

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, NY) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. In a WDM system, plural optical signal channels are carried over a single waveguide, each channel being assigned a particular wavelength. Through the use of optical amplifiers, such as doped fiber amplifiers, plural optical channels are directly amplified simultaneously, facilitating the use of WDM systems in long-distance optical networks.

To provide compatibility of WDM systems with existing networks, it will be desirable to convert a signal from a received transmission wavelength from a customer to a specific channel wavelength within the WDM system. This is particularly true in WDM systems employing many channels, often referred to as "dense" WDM, where channel spacings are on the order of one nanometer or less. Such WDM systems require precise control of the optical signal wavelength for each channel in order to avoid "crosstalk," i.e., interference between adjacent channels.

Previously, attention has been focused on conversion of a single transmission channel from a wavelength outside the wavelength band amplified by optical amplifiers to a wavelength within the wavelength band amplified by optical amplifiers. U.S. Pat. No. 5,267,073 describes wavelength conversion in a conventional single channel optical system to enable signal amplification by optical amplifiers. In the patent, an adapter is provided to receive a transmission optical signal having a wavelength which is outside the operating parameters of the optical amplifier. The signal is supplied to an optical-to-electronic converter module. The resultant electrical signal is output to an adjusting means comprising a laser piloting circuit for directly modulating a signal laser. The output of the signal laser is subsequently amplified by an optical amplifier.

Direct modulation of lasers, particularly semiconductor diode lasers, as described in the '073 patent, is disadvantageous for high data-rate, multiple channel WDM optical communication systems. In direct modulation, the spectral line width of the laser cavity is broadened as a result of frequency chirp. Consequently, the spectral line width of the optical carrier is broadened. Because optical carrier signal spacing is critical in a WDM system, excessive spectral line broadening is unacceptable. Additionally, for long-haul systems, frequency chirp and fiber chromatic dispersion combine to produce pulse spreading, obscuring the information carried by the optical signal.

Thus, there is a need in the art for improved WDM optical communication systems which can receive incoming optical transmission signals and place the information from the transmission signals onto optical channels within the WDM system.

SUMMARY OF THE INVENTION

The present invention provides a WDM optical communication system capable of placing information from incoming information-bearing optical signals onto plural optical signal channels for conveyance over an optical waveguide. The optical system includes N optical transmission elements, where N is a whole number greater than or equal to 2. Each transmission element: emits an information-bearing optical signal at a first transmission wavelength, $\lambda_{Ti}$, where the subscript "T" denotes transmission and where i is from 1 to N. At least M optical receiving systems are provided, each receiving system configured to receive an information-bearing optical signal at a particular reception wavelength, $\lambda_j$, where M is a whole number greater than or equal to N and j is from 1 to M. Each receiving system includes an optical filtering member comprising at least one Bragg grating member for selecting the particular reception wavelength $\lambda_j$. An optical waveguide optically communicates with each of the M receiving systems for transmitting a plurality of optical signals. A plurality of optical amplifiers are positioned along the optical waveguide, each optical amplifier having at least first and second amplifier stages interconnected by an optical connection element having plural ports. The amplifier is configured to amplify plural optical signals simultaneously.

A plurality of optical remodulators optically communicates with the optical transmission elements and the optical waveguide. Each optical remodulator is configured to receive an information-bearing optical signal at a transmission wavelength $\lambda_{Ti}$ and output an information-bearing optical signal at a reception wavelength $\lambda_j$. Each optical remodulator further comprises an optoelectronic element for receiving an information-bearing optical signal at a transmission wavelength $\lambda_{Ti}$ and outputting a corresponding electrical signal which includes the information from the transmitted information-bearing optical signal. The remodulator further includes an optical carrier emitting element for emitting a non-information-bearing carrier optical signal at a reception wavelength $\lambda_j$. The remodulator additionally comprises an external modulator for imparting information directly onto the carrier optical signal from the electrical signal. In this manner, a space-division optical system is converted into a wavelength division optical system by placing incoming transmission signals on the particular narrowband optical signal channels employed in the WDM system.

DETAILED DESCRIPTION

Figure 1:
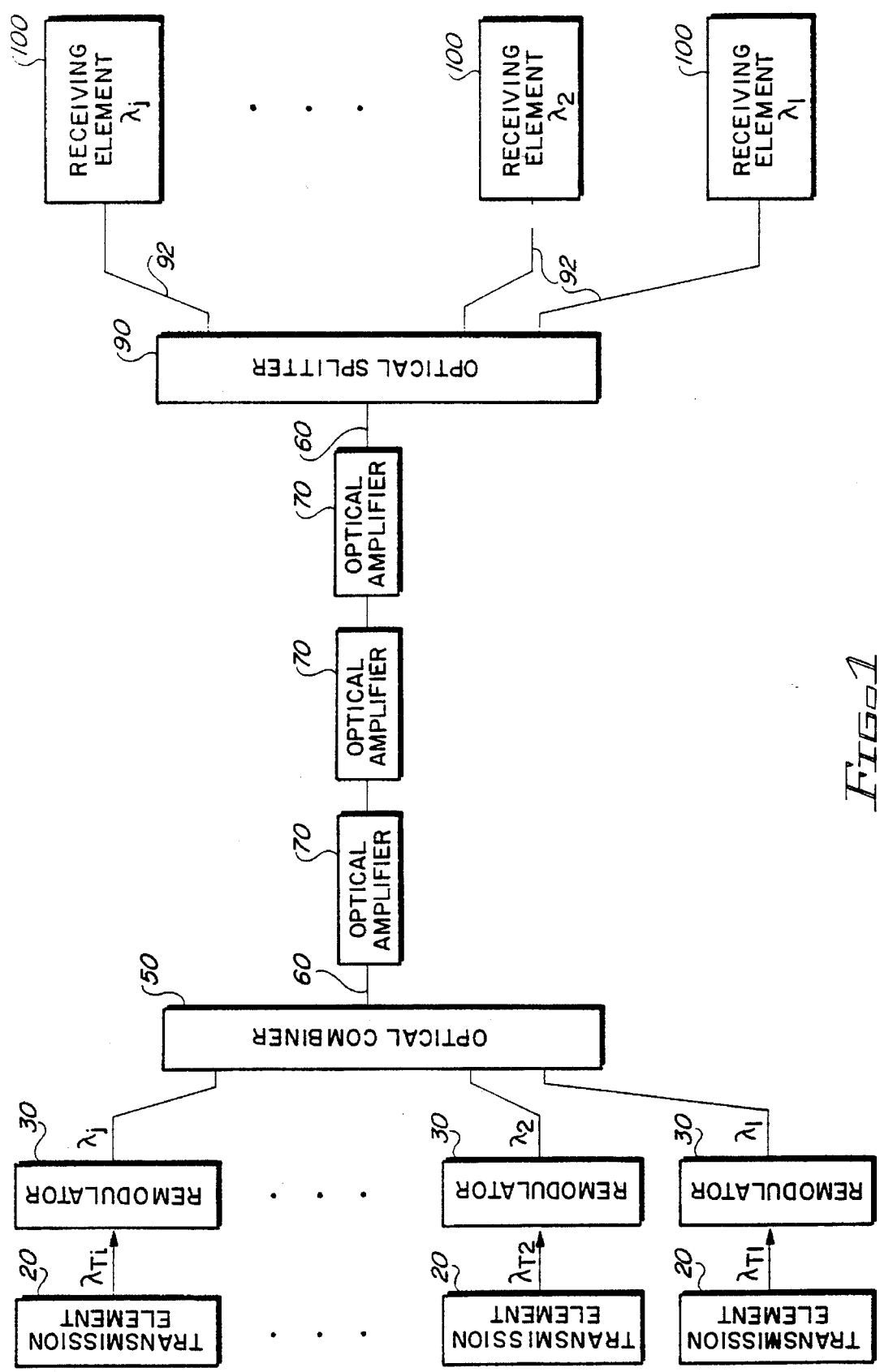
FIG. 1 schematically depicts an optical communication system according to the present invention.

Turning to the drawings in detail in which like reference numerals indicate the same or similar elements in each of the several views, FIG. 1 depicts an optical communication system 10 according to an embodiment of the present invention. Optical communication system 10 operates to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide. Optical communication system 10 includes N optical transmission elements 20, each transmission element emitting an information-bearing optical signal at a transmission wavelength, $\lambda_{Ti}$. Typically, N is a whole number greater than or equal to 2, while i ranges from 1 to N. In an exemplary embodiment, N is at least 4, with values of 8 or 16 being preferred. Each optical transmission element 20 generally includes a laser, such as a DFB semiconductor laser, and a modulator for creation of an information-bearing optical signal, $\lambda_{Ti}$. Although plural transmission elements are provided, the transmission wavelength of each transmission element can be the same or different. Because transmission elements 20 generally form part of an existing optical system, a wide variety of transmission elements emitting in a broad range of wavelengths can be accommodated in the optical communication system of the present invention, thus ensuring compatibility with currently-deployed transmission equipment. Typical transmission elements emit wavelengths ranging from about 1300 to 1600 nm. Transmission elements in current optical communication systems and various optical modulation techniques employed therein are described in Gowar, *Optical Communication Systems*, incorporated by reference above.

Optical communication system 10 includes a plurality of remodulators 30 for receiving the transmitted information-bearing optical signal at transmission wavelength $\lambda_{Ti}$ from transmission elements 20 and transmitting an information-bearing optical signal at a WDM optical system channel wavelength $\lambda_j$. The subscript j ranges from 1 to M where M is a whole number greater than or equal to N, where M corresponds to the number of receiving elements in the optical communications system. The expression "information-bearing optical signal," as used herein, refers to an optical signal which has been coded with information, including, but not limited to, audio signals, video signals, and computer data, generally through modulation. Similarly, the expression "non-information-bearing optical signal," as used herein, relates to a CW optical signal which has not been coded with information, e.g., an optical carrier which has not been modulated. Typically, the wavelengths emitted by the remodulators are selected to be within the 1500 nanometer range, the range in which the minimum signal attenuation occurs for silica-based fibers. More particularly, the wavelengths emitted by the remodulators are selected to be in the range from 1530 to 1560 nanometers. However, other wavelength bands may be selected according to overall system requirements.

Figure 2:
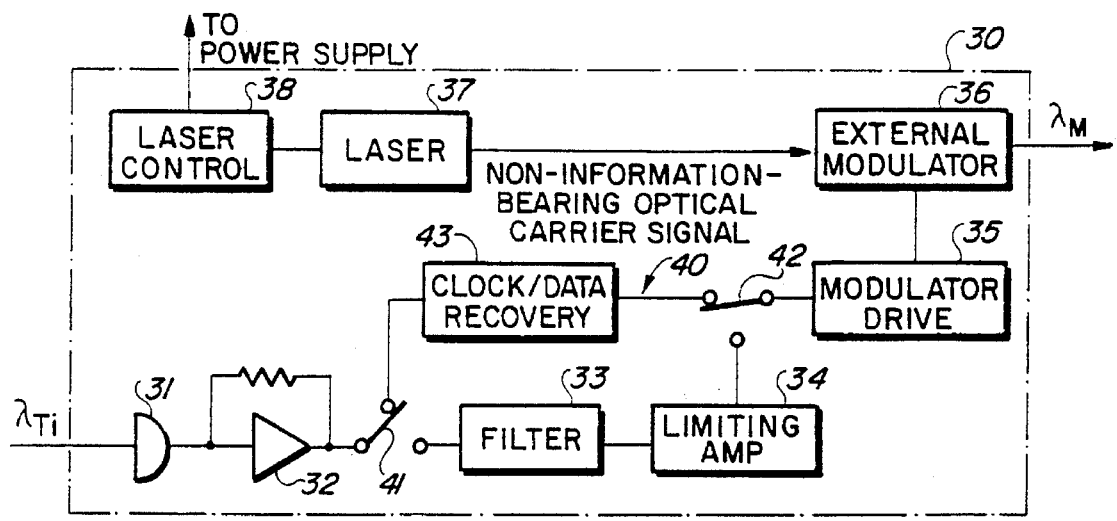
FIG. 2 schematically depicts a remodulator used in the optical communication system of FIG. 1.

An exemplary remodulator 30 for use in optical communication system 10 is schematically depicted in FIG. 2. In remodulator 30, the transmitted optical signal, $\lambda_{Ti}$, is converted by electro-optical converter 32, typically a photo-diode, to an electrical signal. The electrical signal is amplified by transimpedance amplifier 32, passed through filter 33 to limit the noise bandwidth and waveshape the signal, and further amplified by limiting amplifier 34. Optionally, remodulator 30 can include clock and data recovery circuit 40 for use with high data rate signals. Switch 41 automatically selects high data rate signals and passes them through clock/data recovery element 43. The selected signals are retimed, advantageously reducing jitter. The retimed signal exits clock and data recovery circuit through switch 42.

The resultant electrical signal is used to drive external modulator 36 through modulator driver 37. As used herein, the expression "external modulator" includes any modulator which acts on an optical carrier emitted from a continuous wave (CW) optical source, such as a laser. Such external modulators can be packaged with the optical source or packaged separately from the optical source.

Remodulator 30 also includes a optical source, such as laser 37, for delivering a non-information-bearing optical carrier signal to laser output waveguide 39. In an exemplary embodiment, laser 37 is a DFB semiconductor diode laser, generally comprising one or more III-V semiconductor materials, commercially available from a wide variety of suppliers such as Fujitsu, BT&D, GEC Marconi, and Hewlett-Packard. The laser outputs an optical carrier signal at a particular channel wavelength, $\lambda_j$, the wavelength corresponding to a demultiplexer wavelength included in the receiving system. Laser control 38 provides the required laser bias current as well as thermal control of the laser. Using thermal control, the precise operating wavelength of the laser is maintained, typically to within a one angstrom bandwidth.

External modulator 36 acts on the optical carrier signal output from laser 37, as opposed to acting on the laser itself or on a laser driver, as occurs in direct modulation systems. An exemplary external modulator employs a waveguiding medium whose refractive index changes according to the applied electrical field, i.e., a material exhibiting an electro-optic effect. Consequently, the phase of input optical carrier signals is altered as a result of the changing refractive index of the optical waveguide. A suitable electro-optic waveguiding material for the external modulators of the present invention is lithium niobate, $LiNbO_3$. An exemplary electro-optic modulator for use as external modulator 36 is a Mach-Zehnder interferometric modulator which provides high-speed intensity modulation of optical carriers. In the Mach-Zehnder configuration, two optical paths are provided. An incoming optical carrier is split between the two paths of the interferometer. At least one path of the interferometer is phase modulated. When the signal is recombined at the output, the light from the paths either constructively or destructively interferes, depending upon the electrical field applied to the surrounding electrodes during the travel time of the carrier, creating an amplitude-modulated output signal. Further details of electro-optic modulators are described in Becker, "Broad-Band Guided Wave Electrooptic Modulators," *IEEE Journal of Quantum Electronics*, Vol. QE-20, No. 7, July, 1984, pp. 723–727, the disclosure of which is incorporated by reference herein. Mach-Zehnder interferometers suitable for use in external electro-optic modulator 36 are commercially available from United Technologies, and IOC. The modulated output signal is the information-bearing optical signal, $\lambda_j$ whose wavelength corresponds to a particular reception wavelength in the optical communication system.

Optionally, it is desirable to stabilize the operating point of the modulator to ensure proper operation, e.g., to ensure the proper extinction ratio. To stabilize the operating point, the modulated optical signal is sampled from the modulator. An error signal is generated which is indicative of a phase difference between a second harmonic in the modulator drive signal and second order harmonics of the drive signal present in the sampled modulated optical carrier. The error signal is fed back to the modulator to adjust a bias signal to minimize the phase difference, thereby minimizing the second order distortions produced by the modulator. The bias signal can be fed into a bias port provided in the modulator. Optionally, the bias signal generator can include a bias feedback control loop for maintaining the bias voltage at the level selected for modulator operation. External modulator biasing techniques suitable for use in the external modulators of the present invention are further described in U.S. Pat. No. 5,321,543, the disclosure of which is incorporated by reference herein.

Optionally, the remodulator can include means for reduction of non-linear effects, such as stimulated Brilluoin scattering (SBS), in the optical communication system. Suitable devices and techniques for reduction of non-linear effects which can be employed in the optical communication system of the present invention are described in U.S. Pat. Nos. 5,166,821, 5,200,964, 5,257,124, and 5,295,209, the disclosures of which are incorporated by reference herein.

Alternatively, the external modulator employed in the remodulators of the present invention can be selected from electro-absorption external modulators. Electro-absorption modulators function by changing the bandgap of the modulating material to impart information to the optical carrier signal. Exemplary electro-absorption modulators are described in Wood, "Multiple Quantum Well (MQW) Waveguide Modulators," *Journal of Lightwave Technology*, Vol. 6, No. 6, June, 1988, pp. 743–757, the disclosure of which is incorporated by reference herein.

Each information-bearing optical signal $\lambda_j$ produced by a remodulator constitutes a channel in optical system 10, the wavelength of which corresponds to a demultiplexer wavelength in the receiving system. These optical signal channels are output from remodulators 30 and are brought together in optical combiner 50 for conveyance to optical waveguide 60. Optical combiner 50 is selected from any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from Corning, Inc., Corning, N.Y., 1×N wideband single mode splitters available from IOT Integrierte Optik GmbH, Waghausel-Kirrlach, Germany, and fused fiber combiners available from Gould, Inc., Millersville, Md. The combination of channels forms a multiplexed optical signal which is output to waveguide 60. Optical waveguide 60 is typically a single-mode optical fiber such as SMF-28, available from Corning, and TRUEWAVE, available from AT&T Corp., and is the principal transmission medium for the optical communication system. However, any optical waveguide which is capable of transporting multiple optical wavelengths can be employed as waveguide 60 in optical system 10.

Figure 3:
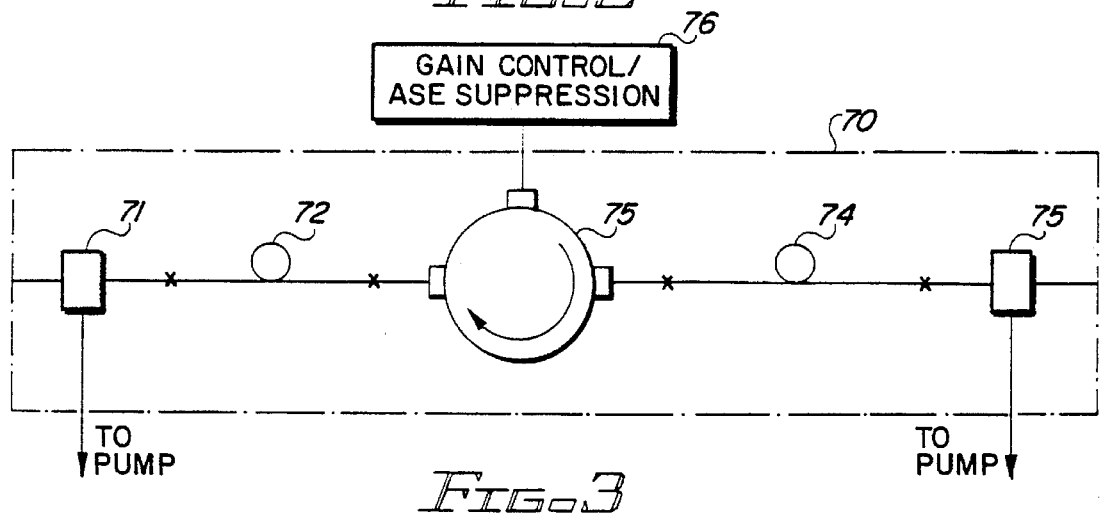
FIG. 3 schematically depicts an amplifier employed in the optical communication system of FIG. 1.

Interposed along optical waveguide 10 are a plurality of optical amplifiers 70. Optical amplifiers 70 are selected from any device which directly increases the strength of plural optical signals without the need for optical-m-electrical conversion. In general, optical amplifiers 70 are selected from optical waveguides doped with rare earth ions such as erbium, neodymium, praseodymium, ytterbium, or mixtures thereof. Optical amplifiers, their materials, and their operation are further described in Gowar, Ed. *Optical Communication Systems*, incorporated by reference above and in Desurvire, *Erbium-Doped Fiber Amplifiers*, (John Wiley & Sons, Inc., NY), c. 1994, the disclosure of which is incorporated by reference herein. An exemplary optical amplifier configuration is depicted in FIG. 3. FIG. 3 illustrates a two-stage optical amplifier having first and second sections of erbium-doped fiber, 72 and 74 respectively. The first and second stages of the amplifier optically communicate with each other through an interconnection element. As shown, the interconnection element is selected to be circulator 75 although other optical components such as isolators, filters, and the like may be used to interconnect the amplifier stages. The depicted circulator comprises three optical ports, the first and third ports connected to doped fiber sections 72 and 74, as shown. Optionally, the second port is connected to a gain control/amplified spontaneous emission (ASE) reduction device 76. Gain control device 76 flattens the gain spectrum of the optical amplifier to provide approximately equal gain across a wavelength band of interest. Gain control device 76 generally comprises components such as a filters or Bragg diffraction gratings interspersed with optical attenuators. The gratings reflect the desired channel wavelengths, passing ASE which then exits the optical system. An exemplary gain control and ASE suppression system for use with the amplifiers of the present invention is described in co-pending U.S. patent applications Ser. Nos. 08/394,340, 08/071,263, 08/367,432, 08/366,472, and 08/366,889 the disclosures of which are incorporated by reference herein. The second port of the circulator can also be used to multiplex additional channels into the optical communications system, such as channels for network monitoring and control having wavelengths outside the gain bandwidth of the amplifier, or additional payload channels. Alteratively, additional ports can be provided in circulator 75 for multiplexing additional channels into the optical communication system. Further descriptions of doped-fiber optical amplifier configurations suitable for use in the optical communication system of the present invention are described in Bjarklev, *Optical Fiber Amplifiers: Design and System Applications*, (Artech House, Norwood, Mass.) c. 1993, the disclosure of which is incorporated herein by reference.

To supply the amplifier stages with pump energy, connecting elements 71 and 75 are provided. These are typically wavelength selective multiplexers which permit pump radiation to enter the doped fiber sections without allowing transmission channel radiation to pass into the pump. Optical pumping elements, not shown, are generally selected from 980 and 1480 nm laser sources. In one embodiment, a 980 nm pump can be used to pump the first stage of the amplifier while a 1480 nm pump is used to pump the second stage of the amplifier. This configuration is described in U.S. Pat. No. 5,140,456, the disclosure of which is incorporated heroin by reference. A single laser source, comprising single or multiple laser diodes, can be used to pump both fiber sections. Alternatively, separate laser sources, having the same or different pumping wavelengths, can be used to pump each fiber section. Further description of amplifier pumping is found in *Optical Fiber Amplifiers*, incorporated by reference above.

Following transmission and amplification of the multiplexed optical signals along waveguide 60, each channel must be demultiplexed and routed to the receiver designated for the particular $\lambda_j$ channel. The multiplexed signal is input to optical splitter 90 which places a portion of the multiplexed signal onto plural output paths 92. Each output path 92 optically communicates with a receiving system 100. Optical splitter 90 is selected from any optical device which can divide an input optical signal and place it onto plural output paths. Exemplary splitters include passive optical components such as those components described for use as optical combiner 50.

Figure 4:
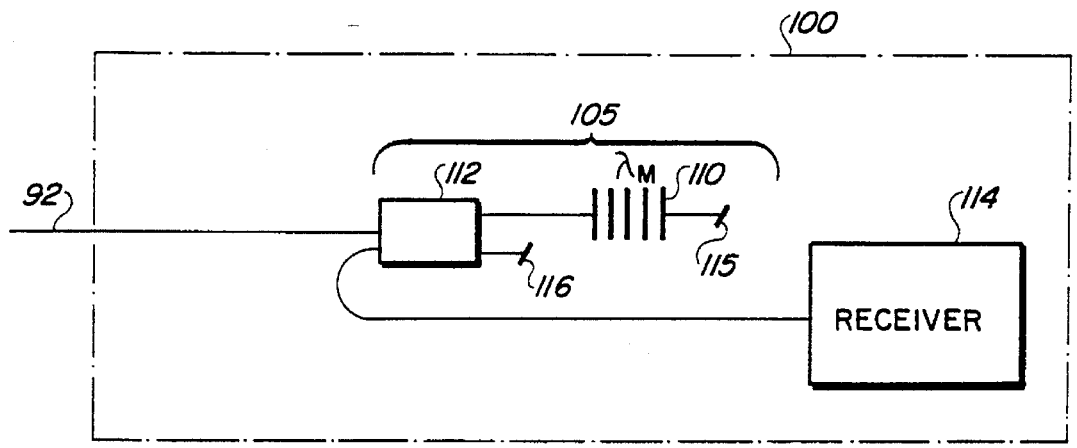
FIG. 4 schematically depicts a receiving element incorporating a Bragg grating member employed in the optical communication system of FIG. 1.

FIG. 4 schematically depicts an exemplary receiving system 100 for use in optical communication system 10. Receiving system 100 includes a demultiplexer 105 for selecting the particular channel, $\lambda_j$, from the multiplexed signal and outputting the selected channel to the receiver. To perform the channel selection, the multiplexed signal is routed to demultiplexer optical filter 110 through splitter 112. The optical filter passes optical signals having wavelengths other than the channel wavelength $\lambda_j$ to be sent to the receiver. These non-selected channels pass through low reflectivity port 115 and exit the optical communication system. The low reflectivity port 115 is typically an angled fiber cut, although any low reflectivity waveguide termination technique may be employed. The channel wavelength $\lambda_j$ is reflected by optical filter 110 to receiver 114 through splitter 112. The unused optical signals exit splitter 112 through low-reflectivity port 116. In an exemplary embodiment, the optical filter comprises a Bragg grating member which reflects the channel wavelength $\lambda_j$ and transmits all other wavelengths. Consequently, the channel wavelengths emitted by the remodulators are matched to the reflection wavelengths of the Bragg gratings incorporated in the receiving systems. Preferably, the Bragg grating comprises a series of photoinduced refractive index perturbations in an optical fiber which causes the reflection of optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8–14, the disclosure of which is incorporated by reference herein.

The reception channel wavelength $\lambda_j$ is input to receiver 114 through splitter waveguide 113. Optionally, the signal may be optically amplified before it reaches the receiver. Receiver 114 generally detects the optical signal and converts it to an electrical signal, typically through the use of a photodiode device. Various optical receivers suitable for use in optical system 10 are described in Gowar, *Optical Communication Systems*, discussed above.

In optical communication system 10, the receiver will frequently be part of an existing optical communication system to which the reception channel wavelength $\lambda_j$ is routed. Consequently, the optical system 10 can function with numerous types of receivers to ensure compatibility with existing optical equipment.

While the foregoing invention has been described in terms of the embodiments discussed above, numerous variations are possible. Accordingly, modifications and changes such as those suggested above, but not limited thereto, are considered to be within the scope of following claims.

What is claimed is:

1. An optical communication system for carrying N multiplexed optical wavelengths over an optical waveguide, where N is a whole number greater than or equal to 2, the communication system comprising:

N optical transmission elements, each transmission element emitting an information-bearing optical signal at a first transmission wavelength, $\lambda_{Ti}$, where i ranges from 1 to N;

at least M optical receiving systems, each receiving system configured to receive an information-bearing optical signal at a particular reception wavelength, $\lambda_j$, where M is a whole number greater than or equal to N and j ranges from 1 to M, each receiving system including a demultiplexer having an optical filtering member comprising at least one Bragg grating member for selecting the particular reception wavelength $\lambda_j$, the Bragg grating member having a reflection band which includes the particular reception wavelength;

an optical waveguide optically communicating with each of the M receiving systems;

a plurality of optical amplifiers positioned along the optical waveguide, each optical amplifier having at least first and Second amplifier stages interconnected by an optical connection element having plural ports, the amplifier being configured to amplify a plurality of optical signals simultaneously;

a plurality of optical remodulators optically communicating with the optical transmission elements and the optical waveguide through an optical combining element positioned between the optical remodulators and the optical waveguide, the optical combining element combining plural optical wavelengths to form a multiplexed optical signal output to the optical waveguide, each optical remodulator configured to receive an information-bearing optical signal at a transmission wavelength $\lambda_{Ti}$ and output an information-bearing optical signal at a reception wavelength $\lambda_j$, each remodulator comprising:

an optoelectronic element for receiving an information-bearing optical signal at a transmission wavelength $\lambda_{Ti}$ and outputting a corresponding electrical signal which includes the information from the transmitted information-bearing optical signal $\lambda_{Ti}$;

an optical carrier emitting element comprising a light source for emitting a non-information-beating carder optical signal at a reception wavelength $\lambda_j$ onto a light source output waveguide; and an external modulator optically communicating with the light source output waveguide for imparting information from the electrical signal onto the non-information-bearing carrier optical signal situated in the light source output waveguide.

2. An optical communication system as recited in claim 1 wherein the external modulator is an electro-optic external modulator.

3. An optical communication system as recited in claim 2 wherein the electro-optic external modulator includes a Mach-Zehnder interferometer.

4. An optical communication system as recited in claim 1 wherein the external modulator further includes means to stabilize the operation 5. An optical communication system as recited in claim 1 wherein the external modulator is an electro-absorption external modulator.

6. A wavelength division multiplexed optical communication system for transmitting a plurality of optical communication channels on an optical waveguide, each optical communication channel having a distinct channel wavelength, the optical communication system comprising:

a plurality of transmission elements, each of the transmitting elements including a laser and a modulator for transmitting an information-bearing optical signal having a transmission element wavelength, a plurality of remodulators optically communicating with the plurality of transmission elements for placing the information from each of the transmission element information-bearing optical signals onto separate optical channels in the wavelength division multiplexed optical communication system, each of the remodulators comprising:

an opto-electronic conversion element for receiving a transmission element information-bearing optical signal and outputting an electrical signal corresponding to information from the transmission element information-bearing optical signal;

a remodulator laser for emitting a continuous wave optical carrier signal, the wavelength of the optical carrier signal being the wavelength of an optical channel in the wavelength division multiplexed optical communication system;

an external modulator for modulating the optical carrier signal emitted by remodulator laser, the external modulator communicating with the electrical signal output from the opto-electronic conversion element for imparting the information from the electrical signal to the to the optical signal through the external modulator to create an information-bearing optical signal corresponding to an optical channel in the wavelength division optical communication system;

an optical waveguide optically communicating with each of the remodulators for receiving a plurality of optical channels, each optical channel having a unique wavelength;

a plurality of optical demultiplexers optically communicating with the optical waveguide, each demultiplexer including a Bragg grating member having a wavelength band of high reflectivity, the wavelength band of high reflectivity for each Bragg grating member corresponding to an optical channel in the wavelength division multiplexed optical communication system; and a plurality of optical receivers optically communicating with the demultiplexers such that each optical receiver receives an optical channel.

7. A wavelength division multiplexed optical communication system as recited in claim 6 wherein the external modulator is an electro-optic external modulator.

8. A wavelength division multiplexed optical communication system as recited in claim 7 wherein the electro-optic external modulator includes a Mach-Zehnder interferometer.

9. A wavelength division multiplexed optical communication system as recited in claim 6 wherein the external modulator further includes means to stabilize the operating point of the modulator.

10. A wavelength division multiplexed optical communication system as recited in claim 6 wherein the external modulator is an electro-absorption external modulator.

* * * * *